United States Patent [19]
Longeval

[11] 3,935,841
[45] Feb. 3, 1976

[54] ROTARY INTERNAL COMBUSTION ENGINE

[76] Inventor: Antoon B. Longeval, August Nobelsstraat, 3, 2700 Sint-Niklaas, Belgium

[22] Filed: Nov. 27, 1973

[21] Appl. No.: 419,247

[52] U.S. Cl. .................. 123/8.47; 64/17 R; 418/35
[51] Int. Cl.² ......................................... F02B 55/14
[58] Field of Search .............. 123/8.47, 8.01, 43 A; 418/33, 35; 64/17 R

[56] References Cited
UNITED STATES PATENTS

| | | | |
|---|---|---|---|
| 331,200 | 11/1885 | Johnston | 64/17 R |
| 1,330,051 | 2/1920 | Berardinelli | 64/17 R |
| 1,556,843 | 10/1925 | Kinder | 123/8.47 |
| 2,071,528 | 2/1937 | Hover | 123/8.47 |
| 2,072,482 | 3/1937 | Myard | 418/35 |
| 3,075,506 | 1/1963 | Berry | 138/8.47 X |
| 3,337,123 | 8/1967 | Bulutay | 418/35 |
| 3,347,214 | 10/1967 | Plagmann | 418/35 |
| 3,712,081 | 1/1973 | Philipp | 123/8.01 |
| 3,807,368 | 4/1974 | Johnson | 123/8.47 |
| 3,829,257 | 8/1974 | Goering | 123/8.47 |

FOREIGN PATENTS OR APPLICATIONS

| | | | |
|---|---|---|---|
| 24,767 | 4/1911 | United Kingdom | 64/17 R |

Primary Examiner—Clarence R. Gordon
Attorney, Agent, or Firm—Pennie & Edmonds

[57] ABSTRACT

A rotary internal combustion engine is disclosed which is entirely cylindrical. The engine includes a cylindrical stator having mounted for rotation therein two pairs of blades on concentric shafts. Means, preferably a universal joint is provided which operates through a gear case to control the relative speeds of the shafts and thus the angle between the blades to change the volume of the combustion chamber through the four operations of intake, compression, expansion (power) and exhaust.

15 Claims, 15 Drawing Figures

ROTARY INTERNAL COMBUSTION ENGINE

FIELD OF THE INVENTION

The field of the invention generally is rotary internal combustion engines in which the four operations of intake, compression, expansion and exhaust take place sequentially. Such engines have been utilized in vehicles and numerous stationary applications.

THE PRIOR ART

Internal combustion engines of at least two types are well known. Reciprocating engines in which pistons are driven rectilinearly to rotate a shaft through a crank are the commonest type of such engine. Rotary combustion engines involving stators having complicated shapes such as epitrochoidal interior chambers and having generally triangular rotors mounted eccentrically therein are also known. In such engines the shapes of the stator and rotor and the eccentric mounting of the rotor are relied upon to change the volume of the combustion chamber.

BRIEF DESCRIPTION OF THE INVENTION

The present invention relates to a rotary internal combustion engine in which the stator is entirely cylindrical and in which the cylinder is divided into combustion chambers which vary in volume during operation by means of two pairs of blades extending diametrically across the cylinder. The blades are supported by concentric shafts mounted concentrically with the cylindrical stator. Means, preferably a universal joint, is provided for causing the blades to move toward and away from each other during rotation thus decreasing and increasing the volume of the combustion chambers defined thereby.

DETAILED DESCRIPTION OF THE INVENTION

Figure 1:
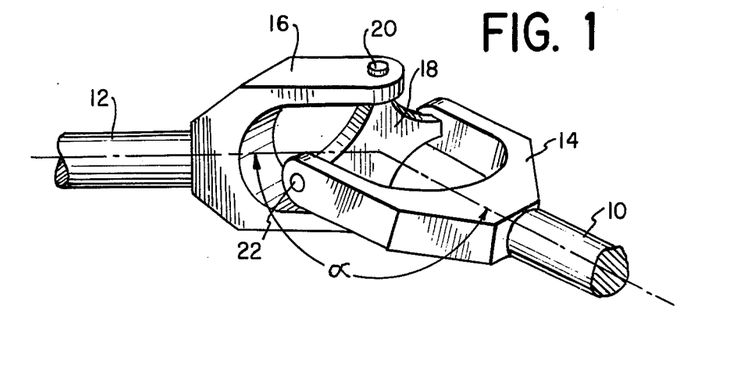
FIG. 1 shows a universal joint of a common type used in this invention.

FIG. 1 discloses a universal coupling or joint having a driving shaft 10 and a driven shaft 12. The shaft 10 has a "U" shaped bifurcated end 14 and the shaft 12 has a similar "U" shaped bifurcated end 16. The "U" shaped bifurcated ends of the shafts 10 and 12 are interconnected through a central member 18 being pivoted thereto at 20 and 22 in known manner. Such a universal joint, sometimes called a Cardan joint, is well known. Rotation of the shaft 10 will cause rotation of the shaft 12 at the same R.P.M. However, such a joint is not a constant velocity joint and as such, whenever the angle $\alpha$ is other than 180°, the driven shaft 12 will, during a single rotation, travel at times faster than the driving shaft 10 and at other times slower than the driving shaft 10 in each rotation. Whenever angle $\alpha$ is other than 180° as shown in FIG. 1, shaft 12 will, in the four quadrants of its rotation, move faster, then slower, then faster again, and finally slower again, than the rotation of shaft 10. This variation in angular velocity of shaft 12 is utilized herein to provide the four phases of intake, compression, expansion (power) and exhaust in the present engine.

Figure 2:
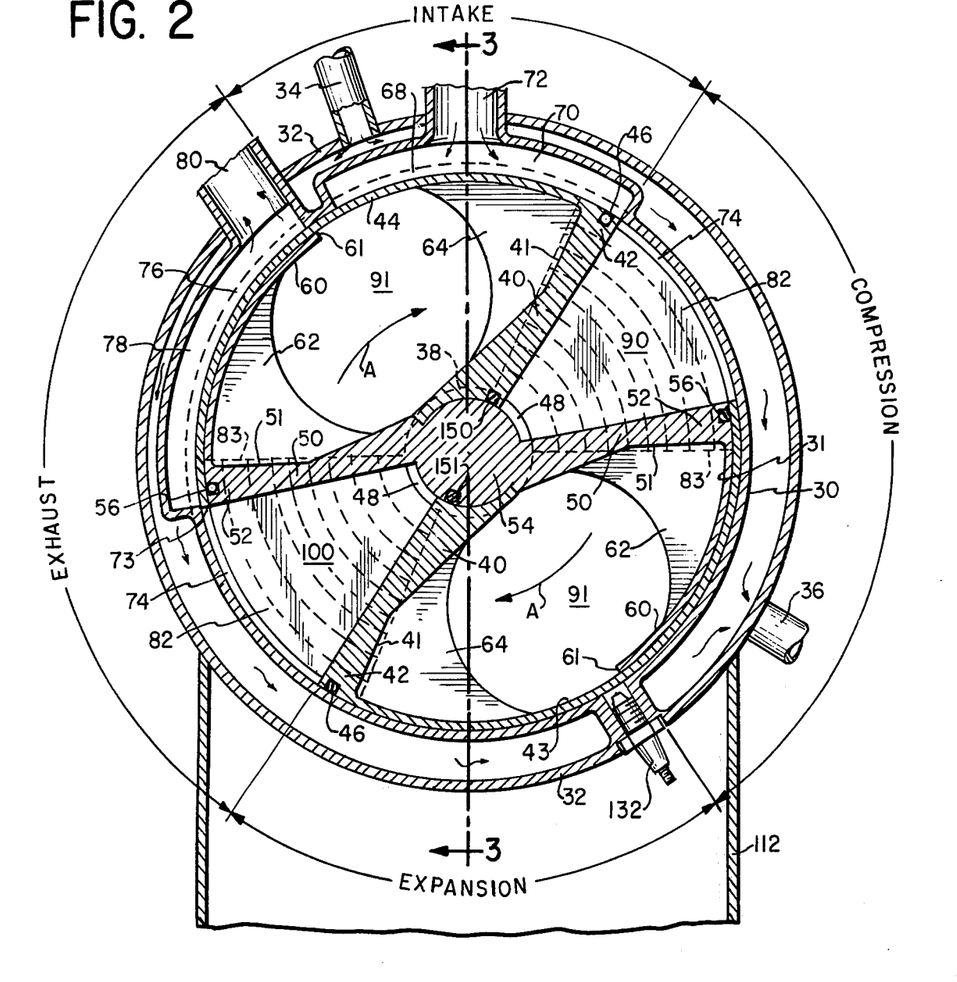
FIG. 2 is a vertical cross-section taken along the line 2—2 of FIG. 3.

In FIG. 2 is shown a somewhat schematic vertical cross-section through the engine of the present invention taken transversally through the shafts. The engine includes a cylindrical stator 30 having a water jacket 32 for cooling arranged concentrically therewith. The cooling water is introduced into the space between the stator 30 and the water jacket 32 through an intake pipe 34 and is removed from such space through an exit port 36. Mounted concentrically with the stator 30 is a hollow shaft 38 having a pair of blades 40 mounted thereon and extending diametrically across the stator 30. Integral with the outer ends 42 of the blades 40 is a cylindrical member 44 extending around the interior of the stator 30 and integral with both blades 40. Seals 46 in the outer surface of the cylinder 44 seal the cylinder 44 in sliding engagement with the inner surface 31 of the stator 30. While for ease of illustration the cylindrical rotor 44 is shown as if in contact with the inner surface 31 of stator 30 throughout its circumference, it will be understood that the outer surface of the rotor 44 is spaced therefrom a small amount and does not actually bear thereagainst. The sliding seal arrangement between rotor 44 and stator 30 is achieved, as mentioned, by seals 46 of which there may be more than the two shown.

The hollow shaft 38 has two diametrically opposite slots 48 therein through which extend blades 50 fixed to shaft 54 mounted internally of and concentric with the shaft 38. The outer ends 52 of the blades 50 extend toward the internal surface 43 of the cylinder 44 and are in slidingly sealed relationship therewith by means of seals 56.

Arcuate plates 60 are mounted at the outer ends 52 of the blades 50 concentric with the cylinder 44. The arcuate plates 60 are spaced a small distance from the inner surface 43 of rotor 44 but such space is too small to be conveniently shown in the drawings. The function of arcuate plates 60 is more fully described hereinafter. Plates 62 are mounted along one side of the blades 50 and are secured thereto as well as to the arcuate plates 60. Similar plates 64 are mounted to the blades 40 and also to the internal cylinder 44 as shown. These members 62 and 64 aid in cooling as well as providing additional strength. The plates 62, particularly, add strength to the arcuate plates 60.

Figure 3:
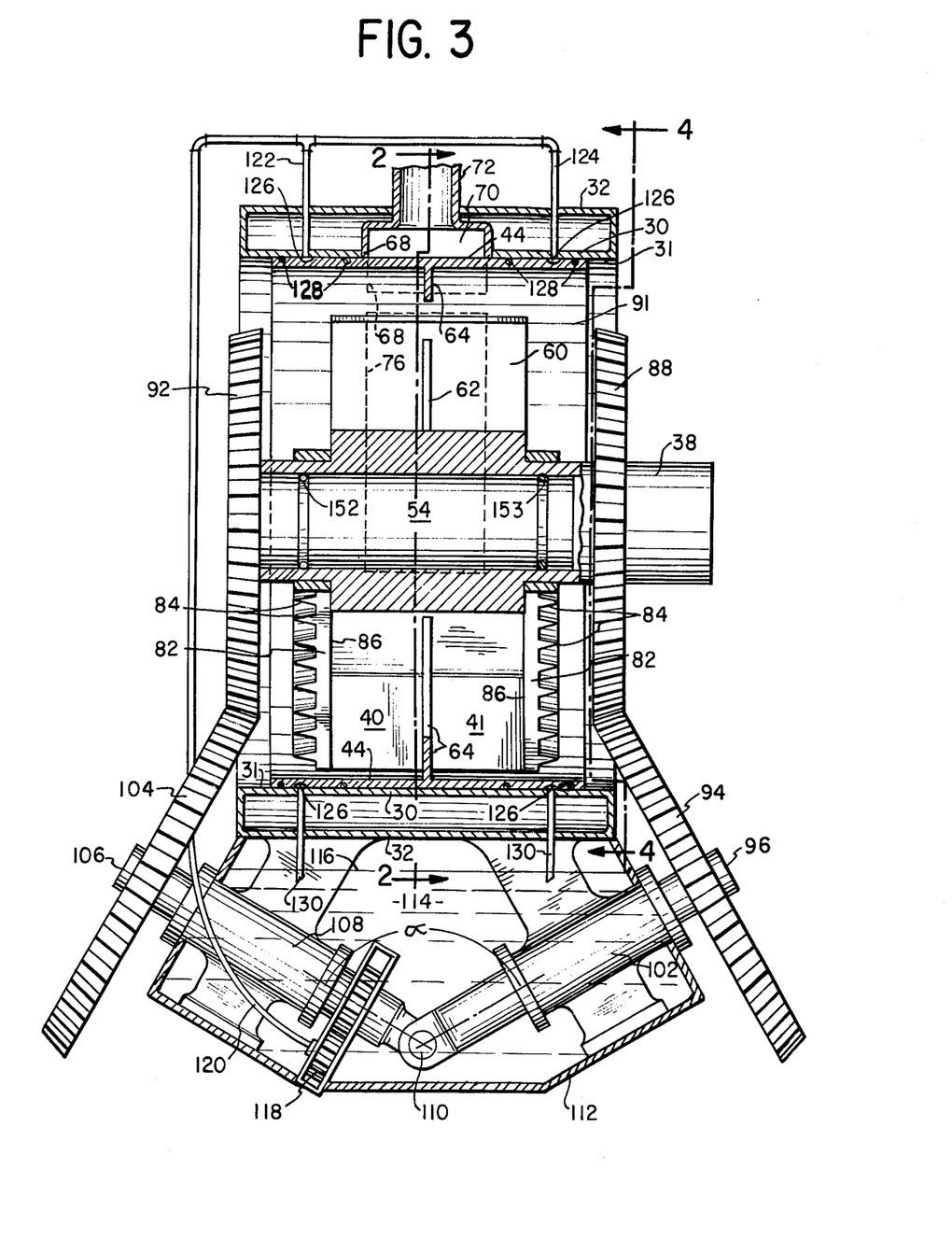
FIG. 3 is in a vertical cross-section taken along line 3—3 of FIG. 2.
Figure 4:
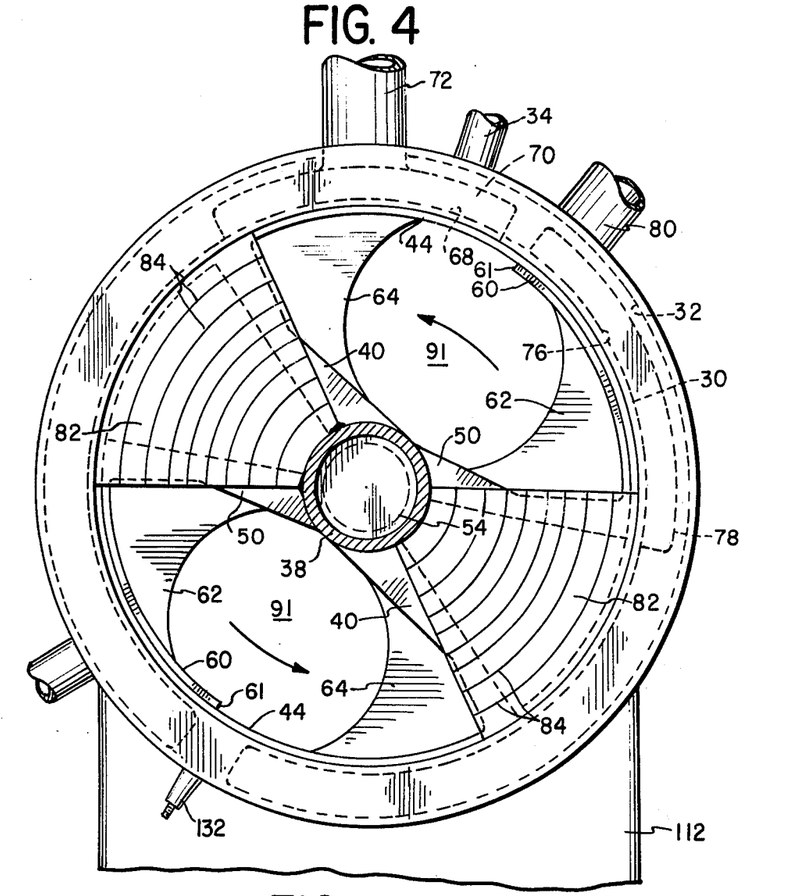
FIG. 4 is taken along the line 4—4 of FIG. 3.

Walls 82, best shown in FIGS. 3 and 4 are fixed to the outer shaft 38, the blades 40 and the cylinder 44. The walls 82 extend forwardly (in a clockwise direction in FIG. 2) from the blades 40 to which they are fixed as far as the blades 50. When the blades 40 and 50 are at their greatest distance apart as shown in FIG. 2, the forward edges 83 of the walls 82 are, as shown, approximately in line with or just beyond the leading edges 51 of the blades 50. Walls 82 together with the blades 40 and 50 and the cylinder 44 define combustion chambers 90 and 100. Combustion chambers 90 and 100 vary in size during rotation as described hereinafter. Fins 84 on the end walls 82 provide for additional air cooling. The lateral sides of the blades 50 are suitably sealed against the interior surfaces 86 (FIG. 3) of the end walls 82. Between the leading edges 83 of the walls 82 and the trailing edges 41 of the blades 40 there are no end walls. Accordingly, the spaces 91 therebetween are open to the atmosphere and the plates 62 and 64 are, preferably, fan shaped to pass air therethrough for cooling.

An arcuate opening 68 in the stator 30 communicates through an intake manifold 70 with the conduit 72 which in turn communicates with a carburetor or like device, not shown. Two diametrically opposite openings 74 in the cylinder 44 permit entrance of the fuel-air mixture into the chambers 90 and 100 between the blades 40 and 50 when an opening 74 aligns with the opening 68 in the stator 30.

An opening 76 in the stator 30 communicates through an exhaust manifold 78 with exhaust conduit 80. When one of the openings 74 communicates with the opening 76 exhaustion of the spent gases through the manifold 78 and conduit 80 is accomplished.

As shown in FIG. 3 the shaft 38 has fixed thereto a gear 88 externally of the engine and shaft 54 has a gear 92 fixed thereto externally of the engine on the opposite side thereof. Gear 88 meshes with a gear 94 fixed upon a shaft 96. Shaft 96 is suitably journaled in a bearing 102.

Gear 92 meshes with a gear 104 fixed to a shaft 106 journaled in a bearing 108. Shafts 96 and 106 are connected at 110 by means of a universal joint of the type shown in FIG. 1. As shown, the angle $\alpha$ between the shafts 96 and 106 is 120°.

The bearings 102 and 108 are mounted within a crank case 112 containing oil 114 therein to a suitable level such as shown at 116. A suitable oil pump 118 (a gear-type pump being shown) pumps oil for lubrication through conduit 120 and thus through conduits 122 and 124 into the space between the rotary cylinder 44 and the stator 30. Grooves 126 in the outer circumference of the rotor 44 receive the oil and help to provide a film between the rotary cylinder and the stator housing 30. Seals 128 in the outer circumference of the rotary cylinder 44 suitably confine the oil film. Drip tubes 130 return the oil to the crank case 112.

The combustion chambers 90 and 100 are sealed off from possible escape of gases into the spaces 91 by the seals 150 and 151 as shown in FIG. 2. The exterior is sealed off by the seals 152 and 153 shown in FIG. 3.

It will be appreciated that the engine described and shown in FIGS. 2 and 3 has two combustion chambers providing two power impulses during each rotation of the shafts 38 and 54.

OPERATION OF THE ENGINE

As shown, the shafts 38 and 54 with their blades 40 and 50, respectively, rotate in a clockwise direction as indicated by arrows A in FIG. 2. The shaft 38 is turned initially by means of a conventional starter, not shown, after which the engine becomes self sustaining. Rotation of shaft 38 and gear 88 thereon in turn rotates gear 94 and shaft 96. The rotation of shaft 96 serves to rotate shaft 106 through the universal joint 110. The rotation of shaft 106 rotates gears 104 and 92 thus rotating shaft 54 and the blades 50 thereon.

The shaft 38 and blades 40 thereon rotate at a constant angular velocity. However, due to the joint 110 and the angle between the shafts 96 and 106, as previously explained, shaft 106 will rotate at varying angular velocities which in turn rotates the shaft 54 and blades 50 at varying angular velocities. Accordingly, the blades 50 are caused to rotate during the intake and expansion portion of the cycle faster than the blades 40 and slower than the blades 40 during the compression and exhaust portions of the cycle. The relative positions of the blades 40 and 50 and the positions of the chambers 90 and 100 through one rotation are best understood from FIG. 5A through 5E.

Figure 5A:
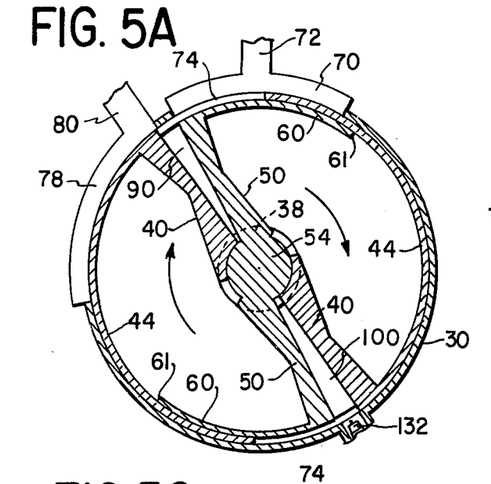
FIGS. 5A through 5E show schematically the positions of the blades during one-half revolution of the engine.
Figure 5B:
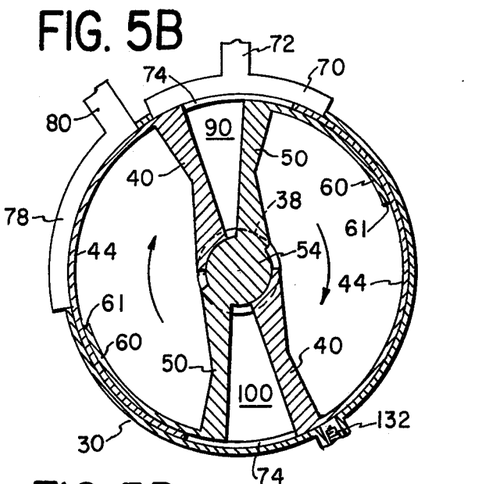
Figure 5C:
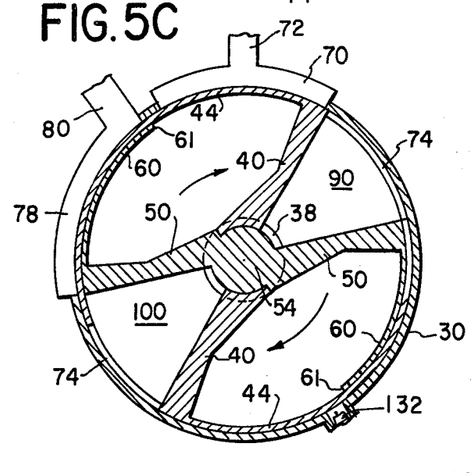

As shown in FIG. 5A, the blades 40 and 50 have reached their closest proximity to each other. The combustion chamber 100 is opposite to the spark plug 132 and the combustion chamber 90 has just completed the exhaust portion of the cycle and is about to begin the intake portion of the cycle. As blades 40 and 50 rotate in a clockwise direction as viewed in FIGS. 5A–5E the blades 50 will move faster than the blades 40 when moving from the position shown in FIG. 5A to that shown in FIG. 5B. This increases the volume of the chamber 90 thus creating a reduced pressure to draw into the chamber 90 the fuel-air mixture from the intake manifold 70. While this movement would initially be provided by a conventional starter mechanism, once the engine is in sustained operation, this movement will be provided by the firing of the spark plug 132 creating an explosion in the combustion chamber 100 and expansion of the gases therein. This expansion exerts pressure against both blades 40 and 50 defining the chamber 100 causing them to separate and increasing the volume of both chambers 100 and 90. Such a separation of the blades 40 and 50 is only possible when the rotor 44 and shafts 38 and 54 continue to turn. The mass of the rotor 44 serves as a flywheel in this embodiment to maintain smooth rotation and forward momentum. Rotation continues until the blades 40 and 50 have reached their greatest distance from one another as shown in FIG. 5C, this being the expansion (power) portion of the cycle for combustion chamber 100 and the intake portion of the cycle for chamber 90. As shown in FIG. 5C, chamber 100 has just completed its expansion and is about to begin the exhaust portion of its cycle. Chamber 90 has just completed its intake portion of its cycle and is about to undergo the compression portion of the cycle. Blades 50, due to their communication through the joint 110, will continue to move faster than blades 40 in advancing from the position of FIG. 5B to that of FIG. 5C.

Figure 5D:
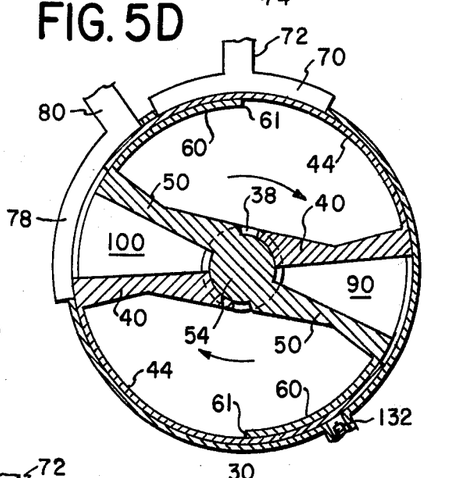

In moving from the position of FIG. 5C to that of FIG. 5D the blades 50 will move at a slower speed than the speed of the blades 40. During this time, therefore, blades 40 begin to "catch up" with the blades 50 thus decreasing the size of chambers 90 and 100. During this time combustion chamber 100 is exhausting while combustion chamber 90 is compressing its air-fuel mixture. The blades 40 continue to "catch up" with the blades 50 during movement from the position shown in FIG. 5D to that shown in FIG. 5E. Once having arrived at the position shown in FIG. 5E the chamber 100 has completed its exhaust and is about to begin its intake while the chamber 90 is now opposite the spark plug 132.

It will be appreciated that FIGS. 5A–5E as just described show one-half of a rotation, i.e., 180° of rotation of the shafts 38, 54 and the blades 40, 50. The remaining half of the cycle is identical to the first half of the cycle excepting only that chamber 90 will now undergo the expansion (power) phase followed by exhaust which chamber 100 has just undergone as described above. Similarly, chamber 100 will now undergo its intake phase followed by compression in the same manner previously described for chamber 90.

Figure 6:
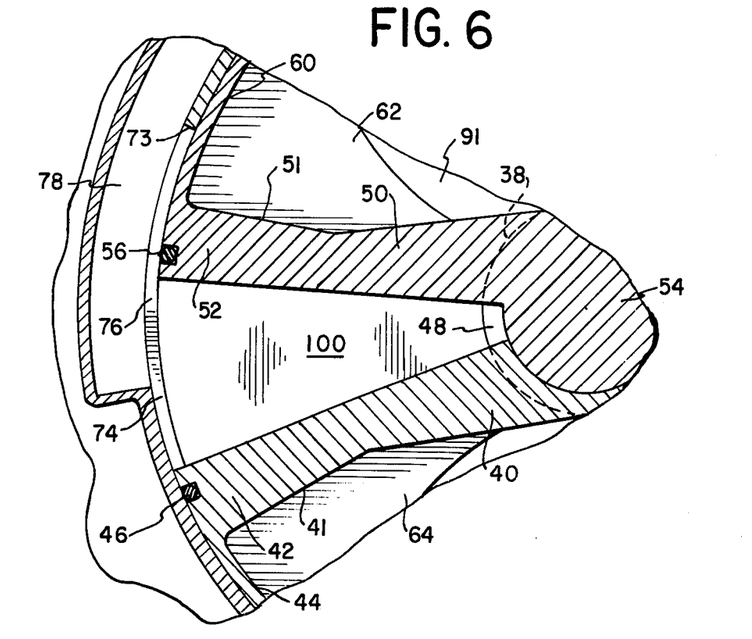
FIG. 6 shows a segment of the device of FIG. 2.

Having reference to FIG. 2, and particularly to the arcuate plates 60, it will be appreciated that the chamber 100 shown in FIG. 2 has reached its maximum expansion and is just about to undergo the exhaust portion of its cycle. As chamber 100 moves clockwise and undergoes exhaust the blades 50 will move at a slower speed than the blades 40 thus permitting the blades 40 to "catch up". As this occurs the cylinder 44 integral with the blades 40 will be moving at a greater angular velocity than the blades 50. Thus, the relationship of the end 52 of the blades 50 with respect to the leading edge 73 of the opening 74 in the rotor 44 will change. Blades 40 and 50 will come closer together and at some point during the exhaust the leading edge 51 of the blade 50 will be rearward (with respect to the direction of rotation) of the leading edge 73 of the opening 74. This relationship is best shown in FIG. 6. As shown in FIG. 6 the exhaust gases from the chamber 100 could pass not only into the exhaust manifold 78 but also over the end 52 of the blade 50 and into the space 91 on the other side thereof. To prevent this possibility the arcuate plates 60 seal off the spaces 91 from the exhaust opening 76 and the manifold 78 as shown in FIG. 6.

Figure 5E:
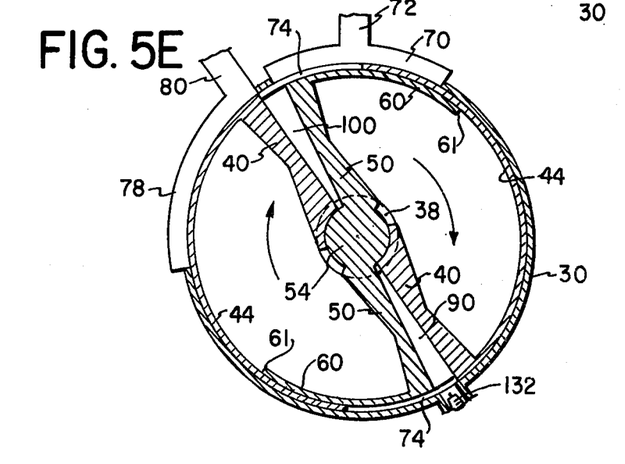

Similarly, when the blades 40 and 50 are at their closest proximity to each other as shown in FIGS. 5A and 5E one of the openings 74 aligns with the opening 68 of the intake manifold 70. Here again the arcuate plates 60 seal the spaces 91 off from any communication with the intake manifold 70. The arc of the arcuate plates 60 is of sufficient length to insure that the leading edge 73 of an opening 74 can never be forward (with respect to the direction of rotation) of the leading edge 61 of its associated arcuate plate 60.

It will be appreciated that the volume of the combustion chambers 90 and 100 is in part a function of the diameter of the stator 30 and in part a function of the location of the blades 40 and 50 with respect to each other at their greatest distance apart. The compression ratio is determined by the difference in volume of the combustion chambers when the blades are at their greatest distance apart and the volume when they are at their closest proximity. This difference in volume is a function of the angle $\alpha$ between the shafts 96 and 106.

MODIFICATIONS

Figure 7:
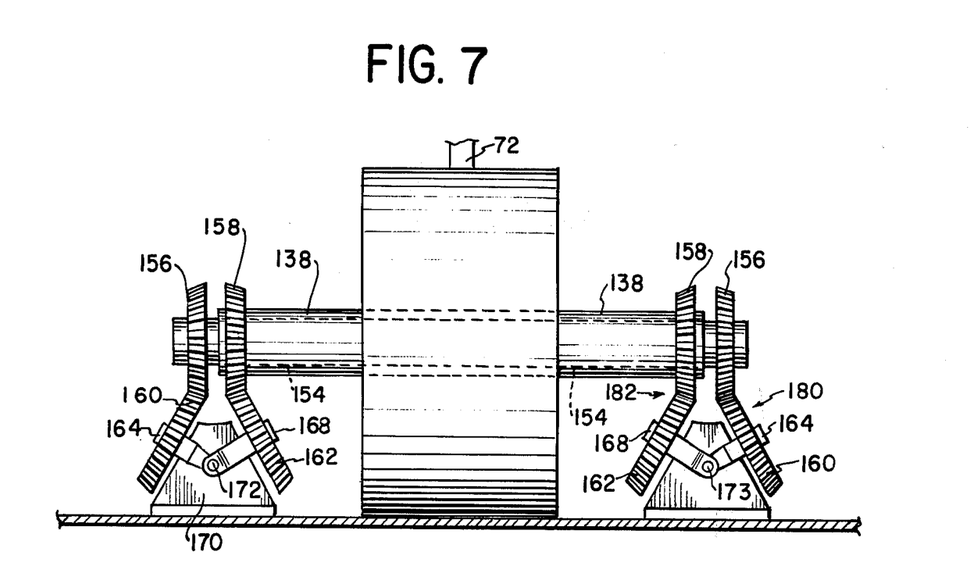
FIG. 7 shows a modification of the location of the gear case and universal joint.

In large engines the gears 88, 94, 92 and 104 tend to become quite large. Accordingly, it may be advantageous to arrange the gears together on one end of the engine as shown in FIG. 7. In FIG. 7 shafts 138 and 154 comparable to shafts 38 and 54, respectively, in FIGS. 2 and 3 are shown extending beyond both ends of the engine. Gears 156 and 158 mounted on the shafts 154 and 138 respectively mesh with gears 160 and 162 respectively. Gears 160 and 162, fixed to shafts 164 and 168 respectively, are journaled in suitable bearings (not shown) in a fixed crank case 170. The crank case 170 being comparable to the crank case 112 shown in greater detail in FIG. 3. The shafts 164 and 168 are interconnected by means of a universal joint 172 of the type shown in FIG. 1. In this arrangement, it will be appreciated, that the gear connections between the shafts 138 and 154 are not confined beneath the engine as in the arrangement shown in FIG. 3, and as such the gears may be smaller.

FIG. 7, also shows a second modification in that the gears 156, 158, 160 and 162, as well as the shafts 164 and 168 are duplicated on both ends of the engine as indicated generally at 180 and 182. In this way, the stresses involved may be distributed between two universal joints 172 and 173.

Figure 8:
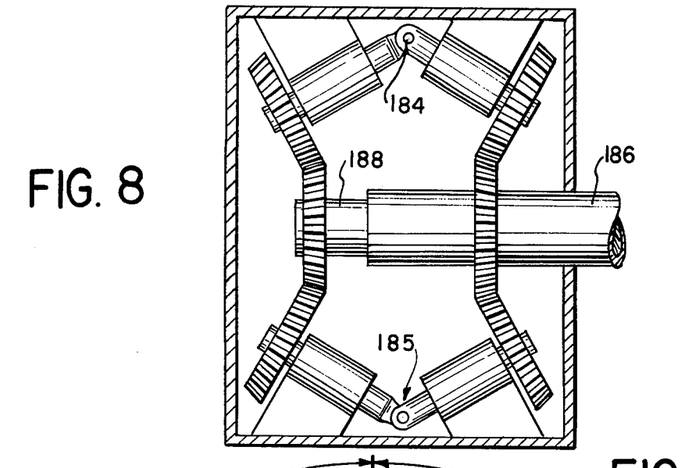
FIG. 8 shows a dual gear case and dual universal joint modification.

For some applications with large engines it may be desirable to distribute the stresses over still additional universal joints such as shown in FIG. 8. As shown in FIG. 8 two universal joints 184 and 185 and their associated gears are arranged on the same end of the shafts 186 and 188. Here again the stresses have been distributed between two universal joints 184 and 185, but this time, contrary to the arrangement in FIG. 7, the joints and their associated gears are put on the same ends of the shafts. FIGS. 7 and 8 can be combined and two universal joints can be provided at each end of the shafts thus providing a division of the stresses of the engine coupling over four universal joints. It is, of course, possible to increase the number of universal joints over which the stresses are distributed to 8. This can be done by providing four universal joints on one end in a construction like that shown in FIG. 8 and then duplicating that arrangement on both ends of the shaft as shown in FIG. 7.

Figure 9:
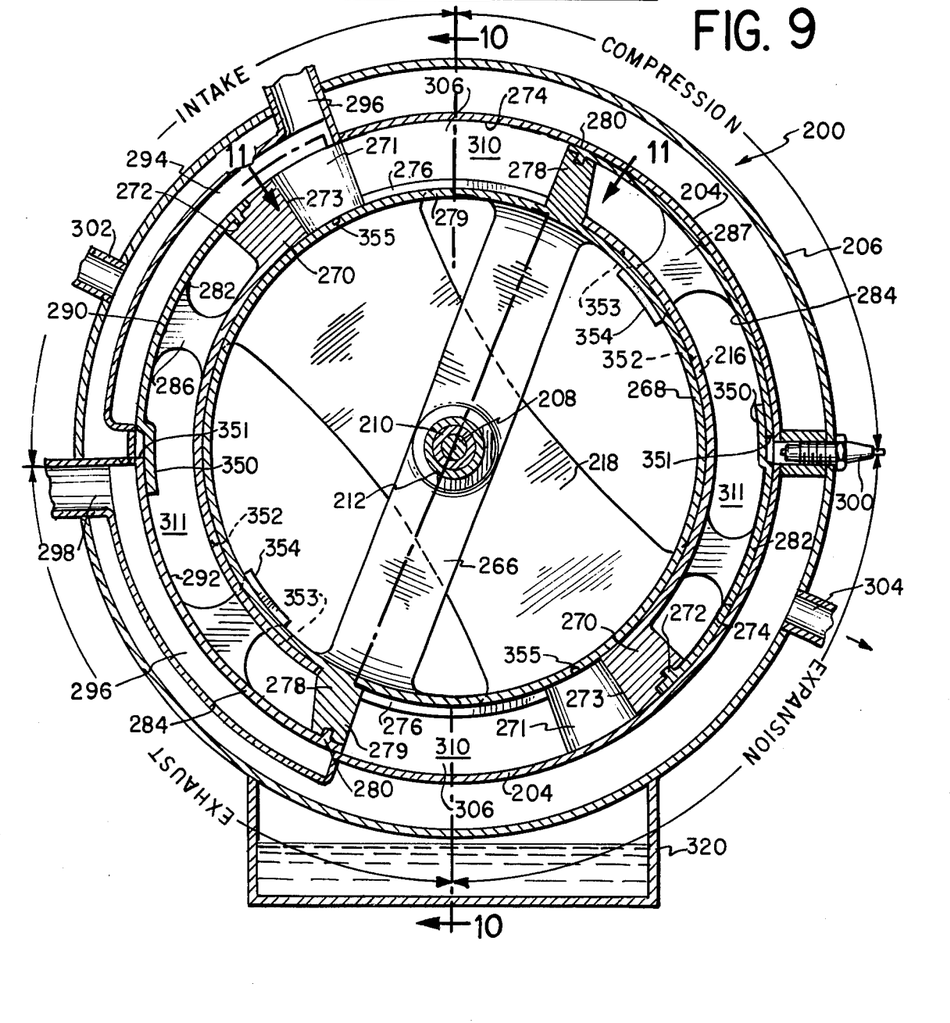
FIG. 9 shows a second embodiment of the engine taken along line 9—9 of FIG. 10.
Figure 10:
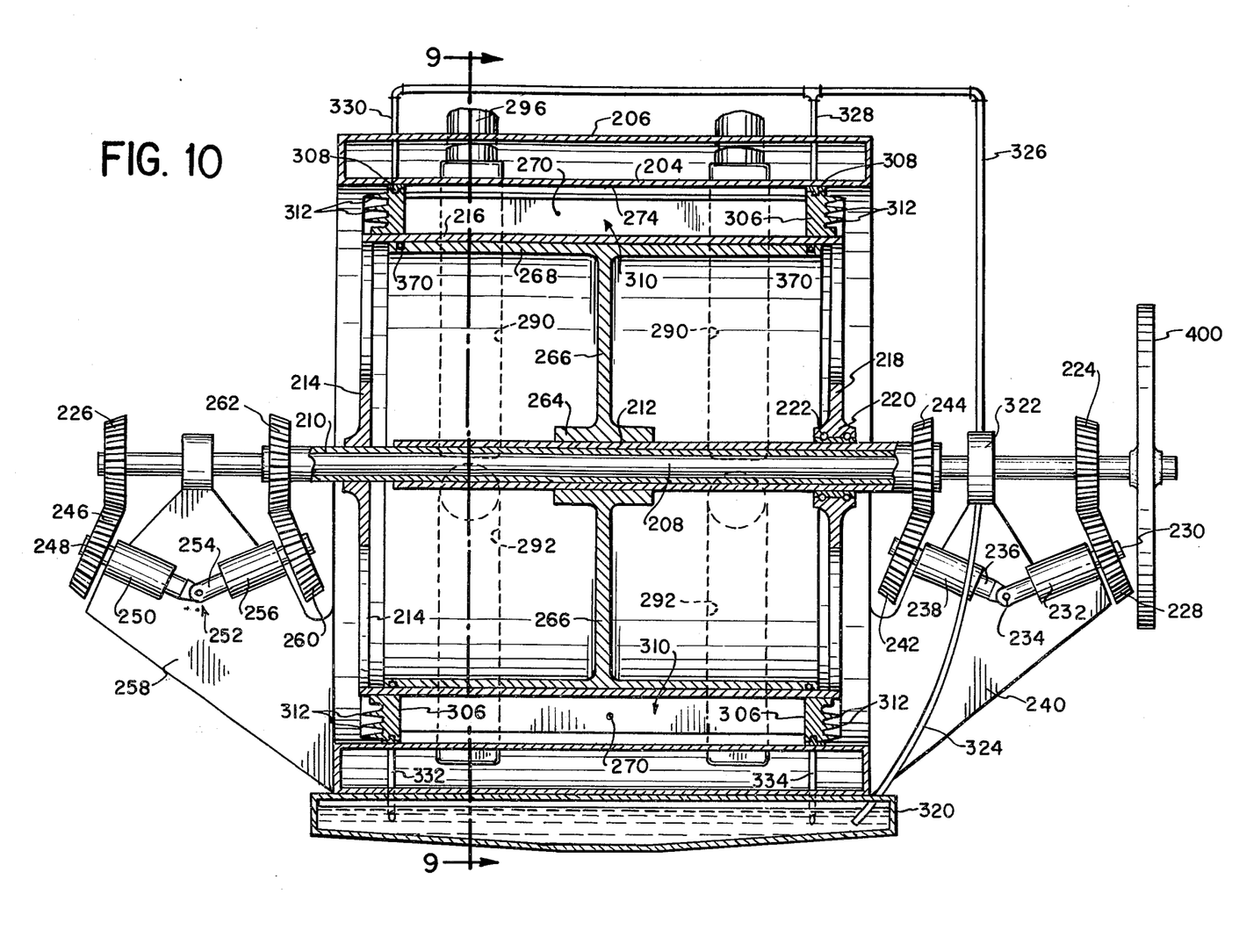
FIG. 10 is taken along the line 10—10 of FIG. 9.

Several other modifications are possible to the engine disclosed in FIGS. 2, 3 and 4. Several of these are shown in FIGS. 9 and 10. In FIG. 9 an engine generally indicated by the numeral 200 is shown as comprising a stator 204 having a water jacket 206 thereabout. At the axis of the cylindrical stator 204 is a solid central shaft 208 having a hollow shaft 210 thereabout and still a third shaft 212 surrounding the shaft 210. As shown in FIG. 10, the shaft 210 supports, by means of the diametrically arranged web 214, a rotating cylinder 216. Opposite web 214 is a web 218 having a hub 220 with a ball bearing 222 therein in which is journaled shaft 212. The central shaft 208 has fixed thereto a gear 224 adjacent one end thereof and a gear 226 adjacent the opposite end thereof.

In mesh with gear 224 is a gear 228 fixed to a shaft 230 journaled in a bearing 232. Shaft 230 is connected through a universal joint 234 of the type shown in FIG. 1 to a shaft 236 journaled in bearing 238. Bearings 232 and 238 are fixed to a suitable part of the frame 240. Shaft 236 has fixed thereto a gear 242 in mesh with a gear 244 fixed to the shaft 212.

On the opposite end of the engine the gear 226 is in mesh with a gear 246 fixed to a shaft 248 journaled in a bearing 250. Shaft 248 is connected through a universal joint 252 of the type shown in FIG. 1 to shaft 254 journaled in bearing 256. The bearings 250 and 256 are fixed to any suitable portion of the frame 258. Shaft 254 has fixed thereto gear 260 which meshes with gear 262 fixed to shaft 210.

For ease of illustration no means for lubricating the bearings 232, 238, 250 and 256 has been shown. However, these may be lubricated in any known manner or bearings having permanent lubrication therein may be used as well known in the art.

Fixed to the shaft 212 through a hub 264 is a web 266 extending diametrically across a cylinder 268.

As shown in FIG. 9 the cylinder 216 carries two outwardly extending blades 270 at positions diametrically opposite to each other. The blades 270 have generally "T" shaped sealing members 272 which seal against the internal surface 274 of the stator 204. The cylindrical rotor 216 also has two diametrically disposed slots 276 therein through which extend blades 278 fixed to the internal rotating cylinder 268. The blades 278 have generally "T" shaped sealing members 280 bearing in sealing arrangement against the interior surface 274 of the stator 204. Fixed to or integral with the sealing members 272 are arcuate plates 282 extending in a counter-clockwise direction from the members 272. Extending from the "T" shaped members 280 in a clockwise direction therefrom are arcuate plates 284. The plates 282 and 284 may be fixed to or integral with their respective sealing members 272 and 280. During rotation centrifugal force moves the "T" shaped sealing members 272 and 280 (as well as other such seals mentioned hereinafter) outwardly together with the ends of their associated arcuate plates 282 and 284 to bear almost against the interior surface 274 of the stator 204. The arcuate plates 282 and 284 need be only wide enough to cover the intake and exhaust openings 290 and 292 respectfully in the stator 204. As used herein, the term "width" refers to the left to right direction in FIG. 10. The intake opening 290 communicates with an intake manifold 294 and conduit 296 which in turn is fed by a carburetor or other like device (not shown). The exhaust port 292 communicates with the exhaust manifold 296 and exhaust pipe 298. A spark plug 300 is positioned as shown to provide a spark inside the stator 204.

Water intake 302 provides water for the space between the stator 204 and the water jacket 206. A water outlet is provided at 304. Fixed to the blades 270 and to the cylinder 216 are opposite side walls 306 extending in a clockwise direction therefrom to the blades 278, when blades 278 are at their greatest distance from the blades 270 as shown. It will be understood that as blades 270 and 278 move closer and farther apart, blades 278 are always between the opposite side walls 306 and are in sliding engagement therewith. The outer edges of walls 306 bear against the interior surface 274 of the stator 204 and have generally "T" shaped sealing members 308 to provide a sliding seal therewith. Blades 270 and 278 define (together with side walls 306, the stator 204 and the rotating cylinder 268) combustion chambers 310. The side walls 306 may be finned as shown at 312 to assist in cooling.

As shown in FIG. 9, the blades 278 and 270 are at their maximum distance from each other; the intake portion of the cycle having just been completed (for chamber 310 at the top in FIG. 9). At this point, of course, the chamber 310 at the bottom of FIG. 9 has just completed its expansion (power) phase of the cycle and is about to commence to exhaust. The blades 270 and 278 reach their closest proximity to each other at one point opposite the spark plug 300 and at a second point 180° therefrom.

The phases and operation of this modification are essentially the same as those for the embodiment shown in FIGS. 2, 3 and 4. However, in this instance neither the blades 270 nor the blades 278 are operating at a constant angular velocity. The blades 278 operate at changing angular velocities determined by the universal joint 234 and the angle between shafts 230 and 236. The blades 270 operate at changing angular velocities determined by the universal joint 252 and the angle between shafts 248 and 254. The shaft 208 rotates at a constant angular velocity and has a flywheel 400 thereon to help in maintaining smooth rotation and forward momentum.

The angles between the shafts 248 and 254 as well as the angle between the shafts 230 and 236 is selected to provide the desired maximum and minimum distance between the blades 270 and 278 during the various cycles of operation.

It will be appreciated that since it is necessary for the blades 270 and 278 to be out of phase in order for them to move toward and away from each other, when the device is assembled the universal joint 234 will be turned through some predetermined angle with respect to the universal joint 252. This difference will, of course, be maintained throughout the life of the engine so long as the joints are not again disassembled. Were this not done, the blades 270 and 278 would remain the same distance apart although both sets of blades would speed up and slow down during rotation. That is to say, the two sets of blades 270 and 278 (if the two universal joints 234 and 252 were assembled in phase) would have the same angular velocities and undergo the same changes in angular velocity at the same time during a single rotation. Under such a circumstance the volume of the chambers 310 would not vary as required. As indicated, this is overcome by assembling the device with the universal joints 252 and 234 out of phase by a predetermined angular amount.

The arcuate plates 282 and 284 are fixed respectively to the cylinders 216 and 268 as indicated in FIG. 9 by means of the webs 286 and 287. The ends of the arcuate plates at the seals 272 and 280 of the arcuate plates 282 and 284 serve as springs so that only the seals 272 and 280 are pressed by centrifugal force against the wall 274. The arcuate plates must be constructed such that they rotate against the wall 274 as close as possible without touching it, thus avoiding wear and overheating. These arcuate plates when rotating alternately move towards and away from each other over a small angle such that the manifolds 294 and 296 could come into connection with the space 311 which is not a combustion chamber were it not for the fact that the offset end 350 of arcuate plate 282 overlaps the end 351 of arcuate plate 284 such that the manifolds 294 and 296 are completely shut off from the space 311 at all points during rotation.

As shown in FIG. 9 the web 286 is fixed to the cylinder 216. The web 287, however, passes through a slot 352 in cylinder 216 and also passes through cylinder 268 through an opening 353. Web 287 is fixed to the inside of cylinder 268 through its inner flange 354.

Lubrication of the embodiment shown in FIGS. 9 and 10 is only schematically shown as including a crank case 320, a pump 322 operated from the shaft 208 and tubing 324, 326, 328 and 330 to supply oil to the interior surface 274 of the stator 204 between such surface and the several "T" seals above mentioned including seals 308. The oil is returned through conduits 332, 334 to the crank case 320. It will be appreciated, however, that the details of the lubrication, both of this embodiment and of the embodiment shown in FIGS. 2, 3 and 4 is well within the purview of one skilled in the art. Additionally, lubrication oil may be incorporated in the fuel-air mixture as is commonly done with two stroke reciprocating engine to provide lubrication to the combustion chambers and, in particular, to the side walls, the seals 272 and 280, interior surfaces 274 and the part of the outer side of cylinder 268 inside the combustion chamber. Sealing is provided between cylinder 216 and 268 by the seals 355 and the exterior is sealed off by means of seals 370 all as shown in FIGS. 9 and 10.

The embodiment shown in FIGS. 9 and 10 includes several modifications as compared with the embodiment of FIGS. 2, 3 and 4. Specifically, the embodiment of FIGS. 9 and 10 includes a separate universal joint coupling mechanism for the two sets of blades 270 and 278. Secondly, unlike the embodiment shown in FIGS. 2, 3 and 4, both sets of blades 270 and 278 bear against the interior surface 274 of the stator 204. Either of these two modifications may be incorporated in an engine without the other. Similarly, FIG. 10 shows two intake and exhaust manifolds and conduits, which feature may be incorporated in the device of FIGS. 2, 3 and 4 independently of other modifications shown in FIGS. 9 and 10.

The timing of the firing of the spark plug 300 in the embodiment of FIGS. 9 and 10, and plug 132 in the embodiment of FIGS. 2, 3 and 4 may be accomplished in known manner by use of coils, distributors, or magnetos, and the like with the timing being controlled from one of the shafts such as shaft 38 or shaft 54 of the embodiment shown in FIGS. 2, 3 and 4 or from one of the three shafts 208, 210 and 212 for the embodiment shown in FIGS. 9 and 10.

Figure 11:
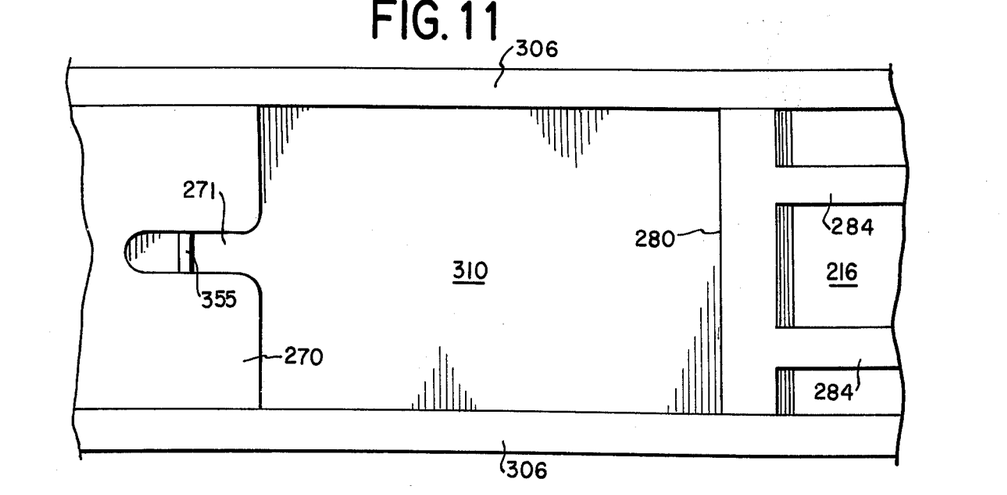
FIG. 11 is taken along line 11—11 of FIG. 9.

At the end of the compression portion of the cycle in the embodiment of FIGS. 9 and 10, the blades 270 and 278 are so close to each other that it becomes difficult to change or adjust the instant of ignition. Accordingly, the combustion chamber has a special shape as best shown in FIGS. 9 and 11. The blade 270 has a central notch-like opening 271 therein which is a continuation of the combustion chamber 310. As shown, this portion 271 of the combustion chamber 310 extends in an arc of approximately 30°. In this manner, the total arc of the combustion chamber extends from the rear wall 273 of the portion 271 forward to the wall 279 of blade 278 and at their closest proximity at the end of the compression portion of the cycle, this arc is thoroughly adequate to provide the required latitude in timing the instance of ignition.

The usual accessories associated with internal combustion engines such as mufflers, oil filters, alternators, batteries, starters, and the like, will, of course, be required depending upon the particular installation contemplated.

The presently disclosed internal combustion engine provides the four phases of intake, compression, expansion (power) and exhaust in a device that is completely cylindrical with all parts rotating and non-reciprocating. As such, considerable savings in weight, cost of manufacture, and the like can be achieved as well as greater longevity of use as compared with conventional reciprocating or rotary engines. Similarly, smoother operation is to be anticipated since the eccentricity of parts inherent in reciprocation engines and the usual rotary engines is not required.

I claim:

1. A rotary internal combustion engine having an operating cycle including the four phases of intake, compression, expansion and exhaust comprising
   a. a stator member having:
      1. a hollow cylindrical cavity;
      2. a fuel intake passage communicating with the cavity;
      3. an exhaust port communicating with the cavity and spaced apart from the intake passage by a predetermined angular distance; and
      4. an ignition means for delivering a spark into the cavity of the stator member at a predetermined point between the intake passage and the exhaust port;
   b. at least two blades;
   c. means for supporting said blades within said cylindrical cavity for rotational movement about the axis of said cavity in a direction extending from the intake passage to the exhaust port and passing through said predetermined point, the facing surfaces of a pair of rotating blades providing two walls of a combustion chamber;
   d. control means for changing the relative speed of rotation of said blades during movement in said direction to produce alternate converging and diverging movement of the facing surfaces of said pair of blades for varying the volume of said chamber in a sequence such that said chamber is increasing in volume when the space between the blades is disposed in communicating relationship with the intake passage and when said blades are moving in said direction from said predetermined point toward said exhaust and decreasing in volume when said space is disposed in communicating relation with the exhaust port and when said blades are moving in said direction from said intake passage toward said predetermined point;
   e. each of said intake and exhaust ports extending through said stator in an arc about the axis of said cavity;
   f. at least one of said blades having an arcuate plate extending from the outer edge thereof in an arc about the axis of said cavity for insuring opening and closing of said intake and exhaust ports in properly timed relationship to the rotation of said combustion chamber.

2. The device of claim 1 in which there are two pairs of said blades and in which each of the blades of at least one pair of said blades has an arcuate plate extending from the outer edge thereof in an arc about the axis of said cavity for insuring opening and closing of said intake and exhaust ports in properly timed relationship to the rotation of said combustion chamber.

3. The device of claim 2 in which said arcuate plates extend forwardly (with respect to the direction of rotation of said blades) from the outer edges of their respective blades.

4. The device of claim 1 including two pairs of such blades, each blade of the first pair of such blades cooperating with a blade of the second pair of such blades to provide two walls of a combustion chamber whereby there are two diametrically disposed combustion chambers in said engine, each combustion chamber having one wall provided by a blade of said first pair and another wall defined by the blade of said second pair, a rotating cylinder within said stator having the outer surface thereof spaced from and in slidingly sealed relationship with the interior surface of said cylindrical stator, said first pair of blades being secured at their outer edges to said rotating cylinder, the second of said pairs of blades having the outer ends thereof in slidingly sealed relationship with the interior surface of said rotating cylinder, an arcuate port for each of said combustion chambers extending through said rotor, the outer edges of said second pair of blades each having a said arcuate plate extending therefrom in an arc about the axis of said cavity, and said arcuate plates cooperating with the ports in said rotor for insuring opening and closing of said intake and exhaust ports in properly timed relationship to the rotation of said combustion chambers.

5. The device of claim 4 in which said arcuate plates extend forwardly (with respect to the direction of rotation of said blades) from the outer edges of their respective blades.

6. A rotary internal combustion engine having an operating cycle including the four phases of intake, compression, expansion and exhaust comprising
  a. a stator member having:
    1. a hollow cylindrical cavity;
    2. a fuel intake passage communicating with the cavity;
    3. an exhaust port communicating with the cavity and spaced apart from the intake passage by a predetermined angular distance; and
    4. an ignition means for delivering a spark into the cavity of the stator member at a predetermined point between the intake passage and the exhaust port;
  b. two pairs of blades each of said pairs being in a plane extending diametrically across said cylindrical cavity;
  c. each of said blade pairs being supported by a rotating shaft with the plane of one of said pairs intersecting the plane of the other of said pairs whereby the space within said cavity is divided into four spaces with two diametrically opposite spaces of said four spaces being combustion chambers in part defined by said blades; one of said shafts being the power output shaft of said engine;
  d. a universal joint unit, including a second pair of shafts;
  e. means, including the angle between the axis of the shafts of said second pair of shafts being other than 180°, for interrelating the angular velocity of said two pairs of blades such that the angular velocity of one of said pairs of blades remains substantially constant throughout rotation while the angular velocity of the other of said pairs of blades alternately increases and decreases throughout rotation whereby during operation the volume of said combustion chambers increases and decreases in size to provide for each of said combustion chambers the four sequential phases of intake, compression, expansion and exhaust, said ignition means being disposed at a point of said stator such that the spark thereof communicates with said combustion chambers in sequence at substantially a point at which the first pair of blades reach their closest proximity to the second pair of blades.

7. The device of claim 6 including a gear train containing one of said first mentioned shafts to one of said second pair of shafts and a second gear train connecting the other of said first mentioned shafts to the other of said second pair of shafts such that said first mentioned shafts are interconnected to each other through said gear trains and said universal joint.

8. A rotary engine according to claim 6, in which the outer edges of the blades of one of said pairs of blades are secured to a rotating cylinder, the outer surface of said rotating cylinder being spaced from and in slidingly sealed relationship with the inner surface of said stator, the blades of the other of said pairs of blades having the outer edges thereof in slidingly sealed relationship with the interior surface of said rotating cylinder, an inlet and outlet manifold each extending in an arc about a segment of said stator and each thereof communicating through an arcuate opening with said cavity, an arcuate plate extending forwardly (with respect to the direction of rotation) from the outer edges of the blades of said outer pairs of blades, and each of said arcuate plates being of such an arcuate dimension as to prevent passage of gasses through said manifolds to or from the interior of said stator when one of said combustion chambers is not in position to receive gasses from or expel gasses into said intake and exhaust manifolds respectively.

9. The device of claim 8 including a gear train connecting one of said first mentioned shafts to one of said second pair of shafts and a second gear train connecting the other of said first mentioned shafts to the other of said second pair of shafts such that said first mentioned shafts are interconnected to each other through said gear trains and said universal joint.

10. A rotary internal combustion engine having an operating cycle including the four phases of intake, compression, expansion and exhaust comprising
  a. a stator member having:
    1. a hollow cylindrical cavity;
    2. a fuel intake passage communicating with the cavity;
    3. an exhaust port communicating with the cavity and spaced apart from the intake passage by a predetermined angular distance; and
    4. an ignition means for delivering a spark into the cavity of the stator member at a predetermined point between the intake passage and the exhaust port;
  b. a pair of blades;
  c. means for supporting said pair of blades within said cylindrical cavity for rotational movement about the axis of said cavity in a direction extending from the intake passage to the exhaust port and passing through said predetermined point, the facing surfaces of said pair of rotating blades providing two walls of a combustion chamber;
  d. control means for changing the relative speed of rotation of said blades during movement, in said direction to produce alternate converging and diverging movement of the facing surfaces of said pair of blades for varying the volume of said chamber in a sequence such that said chamber is increasing in volume when the space between the blades is disposed in communicating relationship with the intake passage and when said blades are moving in said direction from said predetermined point toward said exhaust and decreasing in volume when said space is disposed in communicating relation with the exhaust port and when said blades are moving in said direction from said intake passage toward said predetermined point;
  e. said control means so controlling the angular velocity of said blades as to effect a substantially constant angular velocity for one of said blades throughout rotation about said axis and a changing angular velocity for the other of said blades during rotation throughout said axis.

11. A rotary engine according to claim 1 in which the angular velocity of each of said blades changes during rotation about said axis.

12. A rotary engine according to claim 10 wherein:

a. said means for supporting said blades includes:
1. a first rotatable support member mounting one of said blades;
2. a second rotatable support member mounting the other of said blades; and
b. said control means includes a universal joint unit operatively interconnecting said first and second rotatable support members.

13. A rotary engine according to claim 12 in which said universal joint unit includes two shafts disposed at an angle of other than 180° to each other.

14. A rotary engine according to claim 11 in which said control means includes a shaft rotating at a substantially constant angular velocity and a universal joint unit operatively connected between said shaft and each of said blades.

15. The rotary engine of claim 1 in which both of said blades have the outer ends thereof in sliding contact with the interior surface of said cylindrical stator.

* * * * *